United States Patent
Tingey et al.

(10) Patent No.: US 6,872,375 B2
(45) Date of Patent: Mar. 29, 2005

(54) SYNTHESIS OF HEXAMMINE COBALTIC SALTS

(75) Inventors: Douglas R. Tingey, Logan, UT (US); Robert G. Smith, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 169 days.

(21) Appl. No.: 10/083,976

(22) Filed: Feb. 27, 2002

(65) Prior Publication Data

US 2003/0161779 A1 Aug. 28, 2003

(51) Int. Cl.$^7$ .......................... C01B 21/06; C01G 51/12
(52) U.S. Cl. .................. 423/397; 423/143; 423/383; 423/409
(58) Field of Search .................. 23/295 R; 423/143, 423/383, 396, 397, 409

(56) References Cited

U.S. PATENT DOCUMENTS

| 5,972,304 A | 10/1999 | Bradley et al. ............. 423/386 |
| 6,039,820 A | 3/2000 | Hinshaw et al. ............. 149/45 |

FOREIGN PATENT DOCUMENTS

WO 98/46529 10/1998

*Primary Examiner*—Steven Bos
*Assistant Examiner*—Maribel Medina
(74) *Attorney, Agent, or Firm*—Sally J. Brown

(57) ABSTRACT

The invention provides an effective and efficient method of making a hexammine cobaltic salt, such as hexammine cobaltic nitrate, in a consistent fashion through the control of one or more selected parameters of manufacture. Specific parameters considered and evaluated as a part of the invention included: order of addition of reactants, reaction temperature, oxidation, air or oxidant flow, catalyst content, and amount of ammonia.

32 Claims, 6 Drawing Sheets

SYNTHESIS OF HEXAMMINE COBALTIC SALTS

BACKGROUND OF THE INVENTION

This invention relates generally to gas generant chemical synthesis and, more particularly, to the synthesis of hexammine cobaltic salts such as for use in various gas generation applications and, in particular, for use in or in connection with vehicular occupant inflatable safety restraint systems.

Gas generating materials are useful in a variety of different contexts. One significant use for such compositions is in the operation of safety restraint systems adapted for providing protection to vehicle occupants. One common form of such a restraint system relies on one or more automotive inflatable restraint airbag cushions. It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Such systems typically include one or more crash sensors mounted on or to the frame or body of the vehicle to detect sudden decelerations of the vehicle and to electronically trigger activation of the system. Upon actuation of the system, the cushion begins to be inflated in a matter of no more than a few milliseconds with gas produced or supplied by a device commonly referred to as an "inflator." In practice, such an airbag cushion is desirably deployed into a location within the vehicle between the occupant and parts of the vehicle interior, such as a door, steering wheel, instrument panel or the like, to prevent or avoid the occupant from forcibly striking such parts of the vehicle interior.

Gas generant compositions commonly utilized in the inflation of automotive inflatable restraint airbag cushions have previously most typically employed or been based on sodium azide. Such sodium azide-based compositions, upon initiation, normally produce or form nitrogen gas. While the use of sodium azide and certain other azide-based gas generant materials generally meets current industry specifications, guidelines and standards, such use may involve or raise potential concerns such as relating to the safe and effective handling, supply and disposal of such gas generant materials.

In view of such concerns, significant efforts have been directed to minimizing or avoiding the use of sodium azide in automotive airbag inflators. Hexammine cobaltic salts, such as in chloride, bromide, perchlorate, or nitrate form, constitute a family or class of materials that has drawn interest as or as a part of gas generating compositions for such gas generation applications. In particular, hexammine cobalt nitrate, i.e., $Co(NH_3)_6(NO_3)_3$, (also know as "HACN"), has drawn significant interest in view of various desirable features or characteristics. For example, the combustion or gas-generating reaction of HACN or of a HACN-based formulation to generate or produce substantial quantities of inflation gases, such as $N_2$, can be accomplished almost instantaneously by initiating the gas generation reaction via the simple application of heat or through the use of a suitable igniter device such as of conventional design. Further, HACN provides a relatively high gas output (such as measured on a moles per 100 grams basis). For example, whereas sodium azide has a gas output of approximately 1.50 moles per 100 grams, HACN and HACN/carbon mixtures commonly have gas outputs in excess of 3.50 moles per 100 grams, with such materials typically having gas outputs in the range of about 3.89 to about 3.96 moles per 100 grams. Still further, HACN is a near monopropellant and thus can be practically employed in various gas generating applications without requiring substantial quantities of additional ingredients.

Greater commercial use of HACN, however, has generally been limited or restricted due to a general lack of availability of a suitable method for synthesizing HACN and HACN-based compositions in a manner which is either or both cost effective and time efficient as may be desired. For example, U.S. Pat. No. 5,972,304 is stated as directed to providing a process for producing HACN which saves energy by avoiding multiple alternating heating and cooling steps, which can be performed with a lesser amount of activated carbon and less expensive reagents, which reduces the amount of the potentially environmentally harmful waste, and in which the resultant HACN product is directly obtainable, in a high yield, in particles of acceptable size and purity for use in gas generant compositions. This patent discloses a process wherein an ammonium source, such as ammonium hydroxide, is added to a reaction solution containing at least one cobalt(II) salt having the molecular formula $CoX_2$ and at least one ammonium salt of X where X is, by preference, a selected inorganic anion. The patent further discloses that the reaction solution is aged a predetermined period of time dependent on the aging temperature, wherein the aging temperature is preferably in the range of about 20° C. to about 35° C., and more preferably about 26° C. to about 32° C., and the required aging processing time is at least about 24 hours. As will be appreciated by those skilled in the art, however, processes which involve such extended processing times are generally not conducive to use in large scale manufacturing applications. Further, such processing has generally failed to result in HACN product of consistent and desired performance qualities.

In view thereof, there is a need and a demand for a method or manner of making a hexammine cobaltic salt, such as HACN, which is either or both more cost effective and time efficient as compared to commonly known or currently available methods of making such materials. Further, there is a need and a demand for a manner of making a hexammine cobaltic salt, such as HACN, which desirably results in a hexammine cobaltic salt product of consistent and desired performance qualities.

SUMMARY OF THE INVENTION

A general object of the invention is to provide an improved method of making a hexammine cobaltic salt. Another general though more particular objective of the invention is to provide an improved method of making hexammine cobaltic nitrate having a selected particle size.

A more specific objective of the invention is to overcome one or more of the problems described above.

The general object of the invention can be attained, at least in part, through a method of making a hexammine cobaltic salt and which method involves:

(a) providing a reaction vessel containing an aqueous solution of at least one ammonia source selected from the group consisting of ammonium hydroxide, ammonia-containing gas and combinations thereof;

(b) introducing a solution of $Co(X)_2$ and a solution of $NH_4X$, wherein X is at least one selected from the group consisting of chloride, bromide, perchlorate, and nitrate, into the reaction vessel to form reaction vessel contents comprising a first product precursor;

(c) introducing an oxygen-containing gaseous oxidizer to the reaction vessel contents of (b) to form an at least partially oxidized second product precursor;

(d) heating the at least partially oxidized second product precursor to form a third product precursor;

(e) adding a surface active catalyst to the third product precursor;

(f) continue introducing an oxygen-containing gaseous oxidizer to the catalyst-containing reaction mixture of (e) while maintaining the temperature at a temperature selected to result in product formation of a desired particle size; and (g) cooling the mixture from (f) and recovering the hexammine cobaltic salt therefrom as an admixture with the surface active catalyst.

The prior art generally fails to provide a manner of making a hexammine cobaltic salt, such as HACN, which is either or both cost effective and time efficient as may be desired. Further, the prior art generally fails to provide a manner of making a hexammine cobaltic salt, such as HACN, which results in a hexammine cobaltic salt product of desirably consistent and sought performance qualities.

The invention further comprehends a method of making a hexammine cobaltic nitrate having a particle size in the range of about 35 microns to about 60 microns. In accordance with one embodiment of the invention, such method involves:

(a) providing a reaction vessel containing an aqueous solution of at least one ammonia source selected from the group consisting of ammonium hydroxide, an ammonia-containing gas and combinations thereof;

(b) introducing a solution of $Co(NO_3)_2$ and $NH_4NO_3$ into the reaction vessel to form reaction vessel contents comprising a first product precursor;

(c) heating the first product precursor to a temperature in the range of 95° F. to 120° F.;

(d) introducing an oxygen-containing gaseous oxidizer to the heated first product precursor in (c) to form an at least partially oxidized reaction mixture having an absorbance @ 505 nm of at least about 1.5 AU;

(e) adding a surface active catalyst of activated carbon to the reaction mixture of (d);

(f) continue introducing an oxygen-containing gaseous oxidizer to the catalyst-containing reaction mixture of (e) while maintaining the temperature within a range of about 95° F. to about 120° F. and which temperature is selected to result in to result in the hexammine cobaltic nitrate having a desired particle size; and (g) cooling the mixture from (f) and recovering the hexammine cobaltic nitrate therefrom as an admixture with the surface active catalyst.

The invention still further comprehends a method of making a hexammine cobaltic nitrate having a selected particle size, the method involving:

(a) providing a reaction vessel containing an aqueous solution of at least one ammonia source selected from the group consisting of ammonium hydroxide, ammonia-containing gas and combinations thereof;

(b) introducing a solution of $Co(NO_3)_2$ and $NH_4NO_3$ into the reaction vessel to form reaction vessel contents comprising $Co(NH_3)_5(H_2O)(NO_3)_2$;

(c) introducing an oxygen-containing gaseous oxidizer to the reaction vessel contents of (b) to form $\mu$-peroxobis[pentamminecobalt];

(d) heating the $\mu$-peroxobis[pentamminecobalt] to form pentammine-aqua cobaltic nitrate;

(e) adding a surface active catalyst of activated carbon to the pentammine-aqua cobaltic nitrate;

(f) continue introducing an oxygen-containing gaseous oxidizer to the catalyst-containing reaction mixture of (e) while maintaining the temperature at a selected temperature in the range of about 95° F. to about 120° F. to result in the hexammine cobaltic nitrate having a selected particle size in the range of about 35 microns to about 60 microns; and (g) cooling the mixture from (f) and recovering the hexammine cobaltic nitrate therefrom as an admixture with the surface active catalyst.

As used herein, references to a material or compound as a "monopropellant" are to be understood to generally refer to those single chemical compounds that are stoichiometrically balanced such as to contain or include equivalent amounts of fuel and oxidizer.

Further, references herein to a material or compound as a "near monopropellant" are to be understood to refer to those compounds that are either slightly over-fueled (e.g., contain an excess relative amount of fuel as compared to oxidizer) or slightly over-oxidized (e.g., contain an excess relative amount of oxidizer as compared to fuel).

Other objects and advantages will be apparent to those skilled in the art from the following detailed description taken in conjunction with the appended claims and drawings.

DETAILED DESCRIPTION OF THE INVENTION

The present invention provides an improved method of making a hexammine cobaltic salt. In specific preferred embodiments, the invention more particularly provides an improved method of making hexammine cobaltic nitrate (HACN) having a selected particle size.

Figure 1:
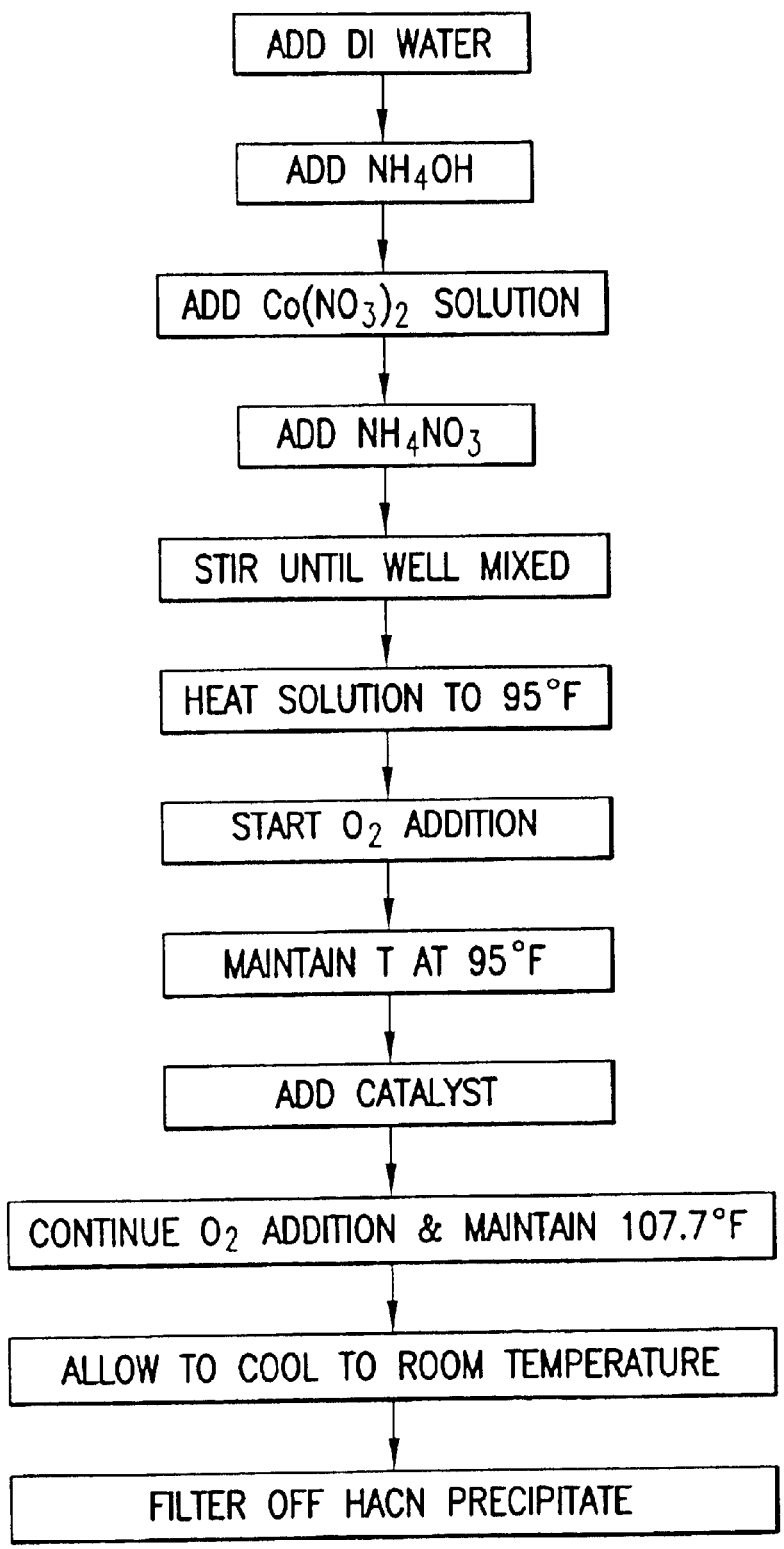
FIG. 1 is a schematic flow diagram of a method of making HACN in accordance with one embodiment of the invention.

Turning first to FIG. 1, there is illustrated a schematic flow diagram for a method of making HACN in accordance with one embodiment of the invention. As detailed below, the formation of this hexammine complex of cobalt in accordance with a preferred practice of the invention can be represented by the following overall chemical equation (1):

$$4Co(NO_3)_2 + 20NH_4OH + 4NH_4NO_3 + O_2 + C \Rightarrow 4Co(NH_3)_6(NO_3) + 22H_2O + C$$ 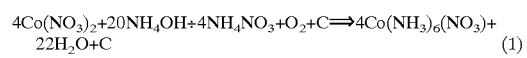

It is to be understood that while the invention is further described below with reference to the preparation of HACN, the broader practice of the invention is not necessarily so limited. For example, if desired, those skilled in the art and guided by the teachings herein provided can practice or apply the invention to the making or synthesis of other hexammine cobaltic salts including, for example, chloride, bromide and perchlorate.

In accordance with the invention, an aqueous solution of at least one ammonia source is provided in a reaction vessel. The aqueous solution can be prepared, by way of example and without limitation, in any suitably sized vessel such as equipped with a mixing or stirring mechanism to permit stirring and/or mixing to correspondingly form substantially homogenous mixtures. Suitable ammonia sources for use in the practice of the invention can include ammonium hydroxide, ammonia-containing gas and combinations thereof, with ammonium hydroxide being a generally preferred ammonia source for use in the practice of the invention.

As shown in FIG. 1, water, e.g., deionized (DI) water, and ammonium hydroxide are each added to the reaction vessel. The mixture is preferably stirred at a moderate speed and mixed to dissolve the salts and form a substantially homogenous mixture. In accordance with a preferred practice of the invention, the ammonia source is added to the reaction vessel in an amount sufficient to provide about 5.5 to about 6.5 equivalents of ammonia to cobalt. In particular, it has been found that processing with such a relative amount of ammonia to cobalt, desirably minimizes or reduces the amount of labile ammonia and thus desirably serves to minimize or reduce required subsequent processing, such as product sparging, without detrimentally impacting reaction time and particle size.

A solution of at least one cobalt(II) salt having the molecular formula $Co(X)_2$ and a solution of at least one ammonium salt of X, e.g., $NH_4X$, where X is preferably an inorganic anion such as at least one of a halogen, such as, chloride or bromide, a perchlorate, and, generally, most preferably a nitrate, are subsequently introduced into the reaction vessel to form reaction vessel contents comprising a first product precursor.

In accordance with a preferred practice of the invention, the formation of such first product precursor can be represented by the following chemical reaction (2):

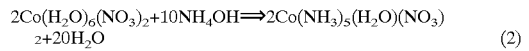
(2)

The first product precursor can then be desirably heated, such as preferably to a temperature in the range of at least about 95° F. up to about 120° F.

Subsequently, an oxygen-containing gaseous oxidizer is desirably added to the heated first product precursor to form an at least partially oxidized reaction mixture. Suitable gaseous oxidizers for use in the practice of the invention include various oxygen-containing gases such as gases which contain or include molecular oxygen including oxygen gas, air, oxygen-enriched air, mixture of oxygen gas with one or more inert gases and various combinations thereof.

In the presence of oxygen, the color of the solution darkens, owing to the formation of the corresponding binuclear dioxygen complex. This complex has been found to be μ-peroxobis [pentamminecobalt] and this reaction is represented by the following chemical reaction (3):

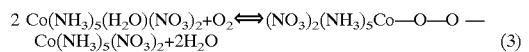
(3)

In accordance with a preferred embodiment of the invention, sufficient oxidizer is introduced to form an at least partially oxidized reaction mixture having an absorbance @ 505 nm of at least about 1.5 Absorption Units (AU).

The uptake of oxygen is virtually instantaneous when the concentration of cobalt ammine complex is high. The μ-peroxo compound is quite stable in the presence of ammonia but readily decomposes in water. As the amount of the μ-peroxo increases, it is less soluble than the cobalt ammine complex and will precipitate as black needle-like crystals. These crystals have been isolated and the analysis of the material verifies its composition as being μ-peroxobis [pentamminecobalt]. When this compound is exposed to ammonia-free water, decomposition occurs and the cobalt ammine complex releases oxygen, e.g., the solution will off-gas the released oxygen. When the compound is heated slightly, the compound proceeds to the next step in the formation of HACN.

The μ-peroxobis [pentamminecobalt] that is formed in the previous step is stable in an ammoniacal solution. Temperature, however, becomes a critical parameter in the conversion of μ-peroxo [pentamminecobalt] to pentammine-aqua cobaltic nitrate (PACN). At higher temperatures (e.g., at a temperature in excess of about 120° F.), the μ-peroxo [pentamminecobalt] appears to decompose back to the cobalt (II) state and to require reforming of the dioxygen bridge material in order for the reaction to proceed to the HACN product. Thus, it has been found that higher temperatures appear to inhibit the reaction and makes it difficult for the reaction to continue to completion. Temperatures in the range of 95° F. to 120° F., however, do not inhibit the conversion of the μ-peroxo [pentamminecobalt] to PACN. Reaction equation (4), below, illustrates this conversion step:

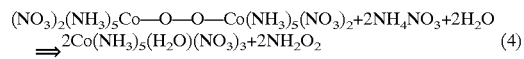
(4)

In such reaction, hydrogen peroxide is also formed. The PACN that is formed is very stable and fairly soluble in an ammoniacal solution. The absorption of such product solution at 525 nm is slightly increased over the cobalt (II) solution but the absorption spectrum has the same general shape as that for the cobalt (II) solution. The hydrogen peroxide reacts with the cobalt (II) as shown below in reaction equation (5):

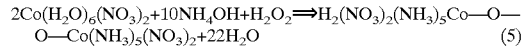
(5)

This intermediate product is referred to as the superoxobis [pentamminecobalt]. This intermediate product is very unstable and quickly converts to PACN. The formation of PACN through this route is represented by reaction equation (6), below:

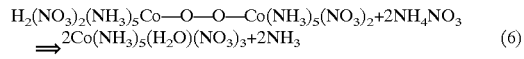
(6)

The cobalt (II) has two different methods of converting to PACN. The first method involves a direct conversion to PACN via initial oxidation with molecular oxygen. Such a method is generally completely dependent on the oxygen, e.g., air, flow into the system along with the oxygen dispersion efficiency. The second method of conversion involves oxidation of the cobalt (II) via the peroxide and subsequently by the superoxide. This second method is generally dependent upon the concentration of μ-peroxide that is formed and the temperature of the solution.

The final step in the formation of hexammine cobalt nitrate is the substitution of one more ammonia groups into the cobalt complex. This step of the reaction process uses a surface active catalyst such as in the form of activated carbon, e.g., a reduced carbon catalyst with a very high surface area (1000 m²/gram). With the addition of such a carbon catalyst, the PACN undergoes a substitution reaction where the final ammonia is substituted into the cobalt complex in place of the aqua complex as shown in equation (7), below:

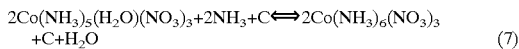

$$2Co(NH_3)_5(H_2O)(NO_3)_3 + 2NH_3 + C \rightleftharpoons 2Co(NH_3)_6(NO_3)_3 + C + H_2O \quad (7)$$

Once this substitution takes place, the hexammine cobalt nitrate forms and because the HACN is fairly insoluble, it precipitates. In general, the rate of this precipitation is directly related to the concentration of PACN available to react as well as the temperature of the solution. In practice, it has been found that carbon concentration only effects this rate of formation when the carbon concentration is less than 0.33% of the final HACN weight.

Figure 2:
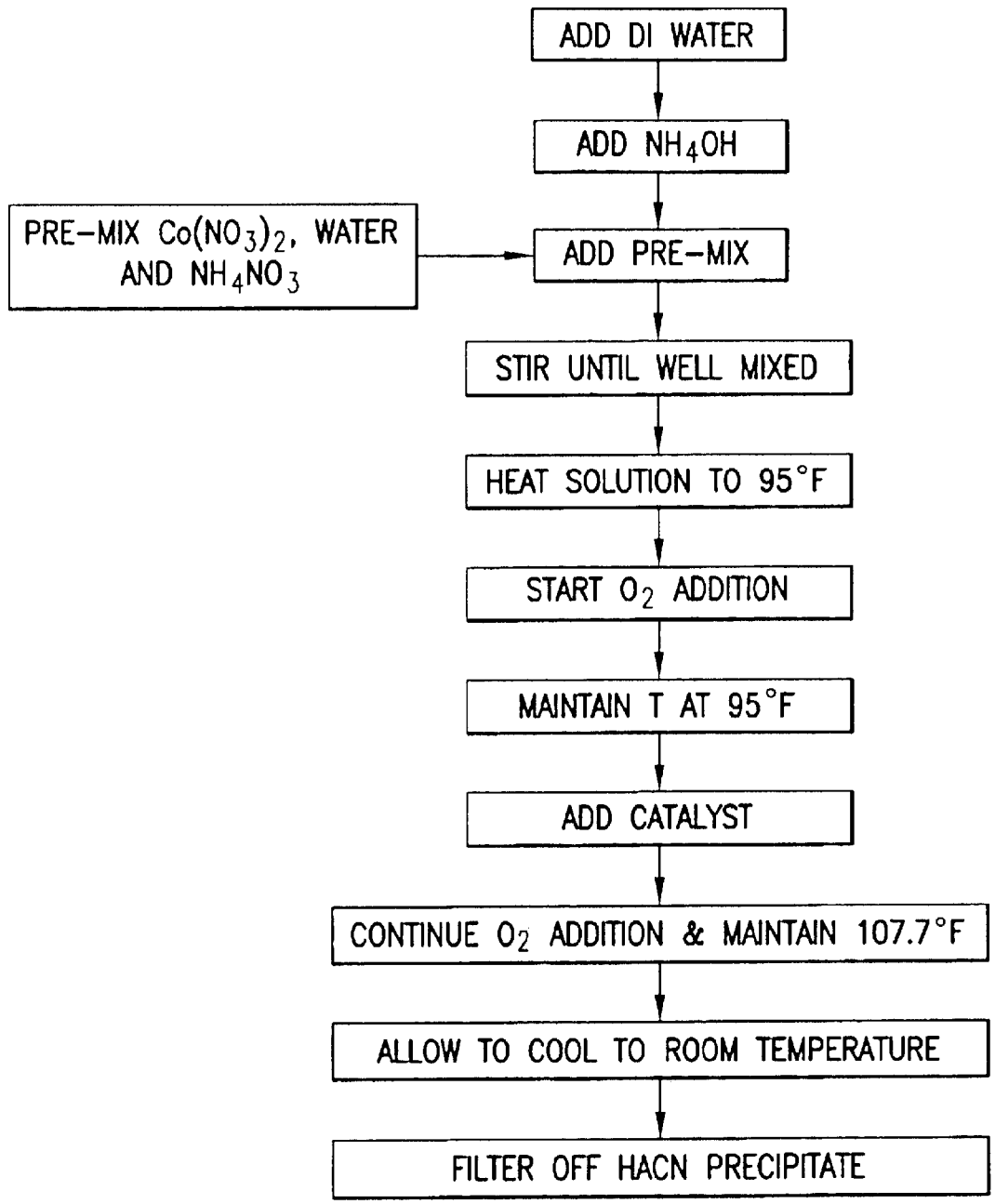
FIG. 2 is a schematic flow diagram of a method of making HACN in accordance with another embodiment of the invention.

FIG. 2 is a schematic flow diagram of a method of making HACN in accordance with another embodiment of the invention. This method of making HACN is generally similar to the method schematically shown in FIG. 1 except now a premix of $Co(NO_3)_2$ and ammonium nitrate is used. As shown, the premix can be separately prepared and used as such for the ammonium hydroxide addition.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1 and Comparative Example 1

In Comparative Example 1, the order of addition of the raw materials described in U.S. Pat. No. 5,972,304, identified above, was followed. In accordance therewith, the appropriate deionized water was added to the reactor and then the cobalt premix (which is a 9.75% cobalt, 20% ammonium nitrate solution) was added to the reactor. Then ammonium hydroxide (30% aqueous ammonia) was slowly added to the solution.

When this order was followed, the cobalt was essentially titrated slowly and a blue precipitate was formed and this solid material settled to the bottom of the reaction vessel. This blue precipitate is believed to be a cobalt (II) ammine aqua hydroxide $[Co(NH_3)_x(H_2O)_{6-x}]^{2+}[(OH)_2]^{2-}$. After the complete addition of the total amount of ammonium hydroxide, this blue compound slowly dissolved.

Within the reactor, the stir speed and the rate of addition of the ammonium hydroxide will affect the formation and dissolution of this complex. The slower the rate of addition, the more complex is formed. With a faster stir speed, the compound will dissolute quicker. If these parameters (e.g., stir speed and rate of addition) vary, then the formation will be variable. Experiments were performed where this precipitate was purposely formed and dissolution of the material was inhibited by not stirring the solution. Oxidation was performed on the sample and the rate of oxidation was measured (by absorption) to be slower than when the precipitate was not present.

In Example 1 and in accordance with one preferred embodiment of the invention, a premix of $Co(NO_3)_2$ and ammonium nitrate was added to the water and ammonium hydroxide that is already present in the reaction vessel. In particular, it has been discovered that adding $Co(NO_3)_2$ and ammonium nitrate to ammonia-containing water desirably prevents or prohibits the formation of the cobalt ammine aqua complex. It is theorized that this is due to the cobalt that is introduced to the reaction vessel encountering an excess amount of ammonia such that the complex cannot form.

In view thereof and in accordance with a preferred practice of the invention, it is recommended that $Co(NO_3)_2$ and ammonium nitrate, such as in a premix solution, be added to an ammonia-containing aqueous solution.

Examples 2–9

Effect of Reaction Temperature on HACN Particle Size

The effect of reaction temperature on HACN particle size was studied in a series of tests using a 5-gallon reactor. The reactor was glass-lined and had a water jacket surrounding the vessel. A large temperature control water bath was connected to permit control of the temperature of the reaction.

Figure 3:
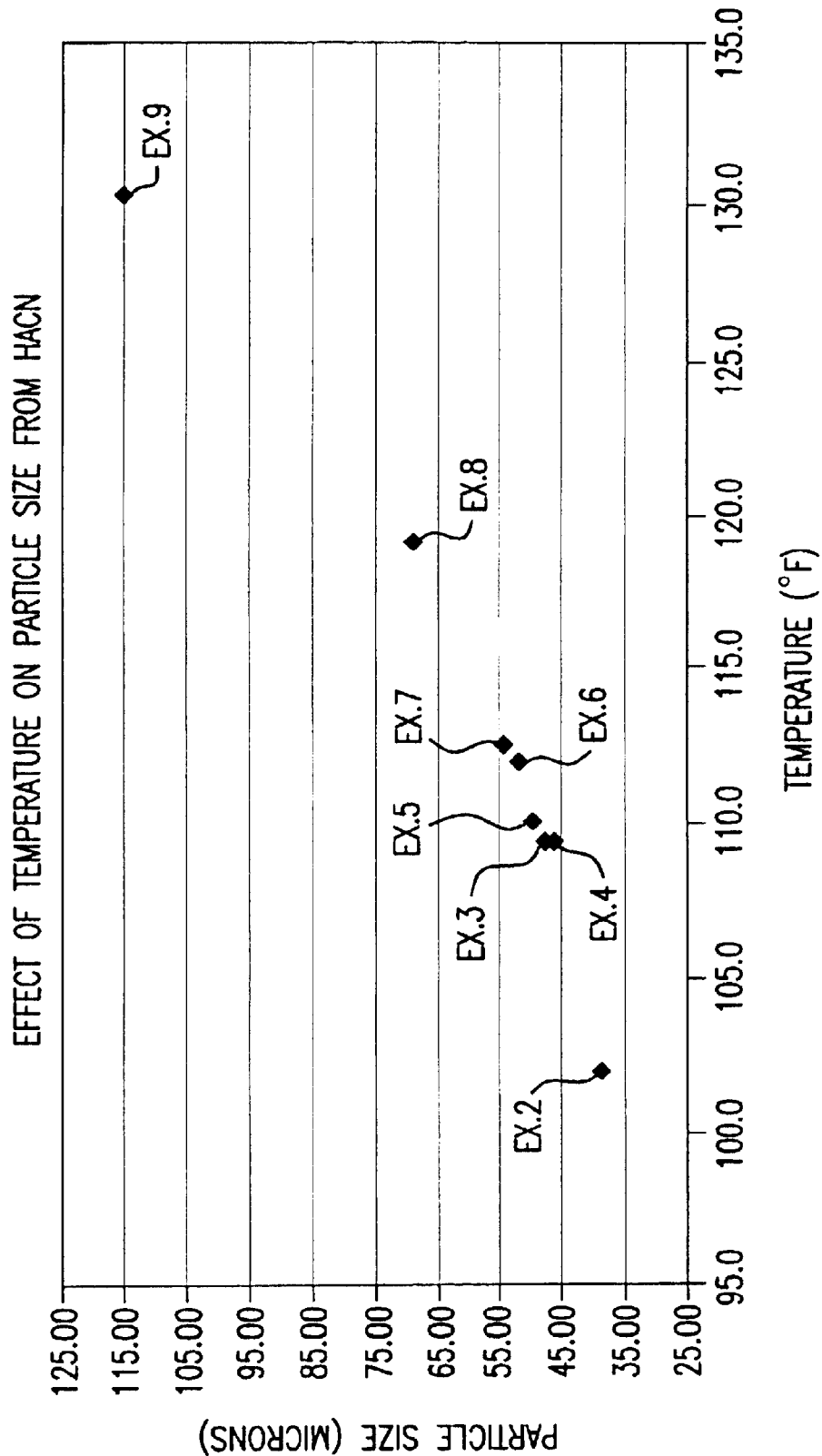
FIG. 3 is a graphical representation of particle size as a function of reaction temperature obtained in Examples 2 to 9.

FIG. 3 illustrates the effect of the temperature on HACN particle size realized in these examples wherein the particle size referred to here is the 50% particle size obtained by the use of the Honeywell Microtrac X-100 laser diffraction system. FIG. 3 shows a very strong correlation of the particle size as a function of the temperature.

Based on such testing, it has been calculated that a reaction temperature of about 103.3° F. is required to obtain 40 micron HACN. Similarly, a reaction temperature of about 107.7° F. has been calculated as required to obtain 45 micron HACN. The temperatures cited here would be the temperature at which the bulk of the HACN is made in the last step from PACN to HACN. The prior art method of manufacturing of HACN, such as disclosed in U.S. Pat. No. 5,972,304, generally cannot control the temperature at which the bulk of the material is made. This is due to the fact that the reaction is allowed to exotherm to 130° F. and temperature at which the bulk of the material being made varies depending on the amount of oxidation that is allowed prior to the addition of carbon. Thus, the present invention wherein the reaction can desirably be performed at an isothermal set point will reduce the particle size distribution and more importantly permit desired control the particle size.

Examples 10–19

Effect of Oxidation on Particle Size

The amount of oxidation that has taken place prior to the addition of the carbon in this reaction has been found to be a critical parameter that effects the HACN particle size. Further, absorbance of the reaction solution is directly related to the amount of oxygen that the ammoniacal cobalt solution has been exposed to and the overall oxidation can be determined by the amount of oxygen that has been introduced to the system.

Figure 4:
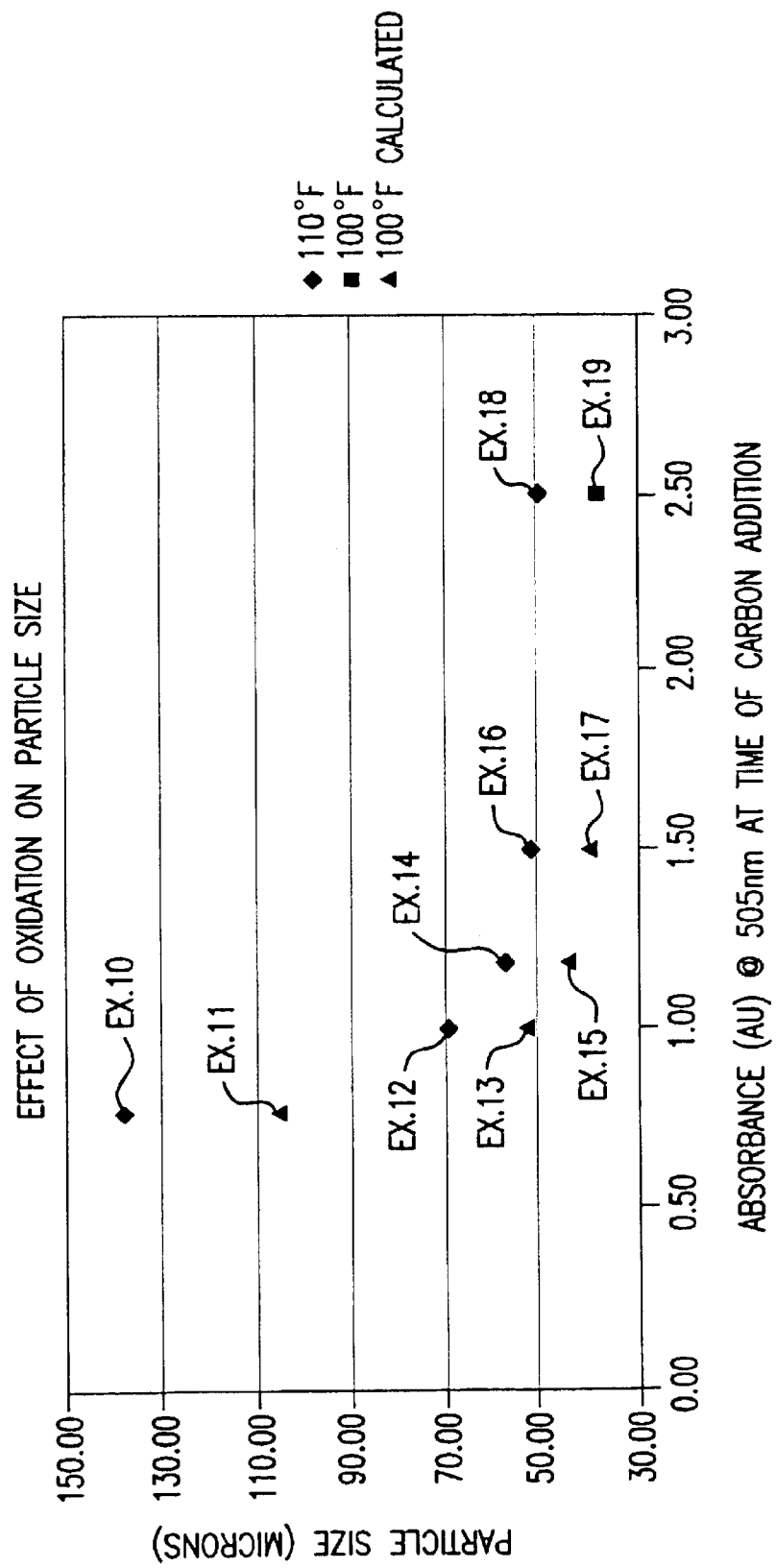
FIG. 4 is a graphical representation of particle size as a function of reaction solution absorbance obtained in Examples 10 to 19.

FIG. 4 and TABLE 1 show the data obtained in experiments where the absorbance (i.e., amount of oxidation) was varied prior to the addition of carbon catalyst at a temperature of 110° F. for Examples 10, 12, 14, 16 and 18, respectively, and at a temperature of 100° F., respectively, for Examples 11, 13, 15, 17 and 19, respectively.

TABLE 1

| Example | Absorbance (AU) @ 505 nm | Particle Size ($\mu$m) |
|---|---|---|
| 10 | 0.75 | 137.10 |
| 11-calculated | 0.75 | 105.60 |
| 12 | 1.00 | 68.88 |
| 13-calculated | 1.00 | 53.03 |
| 14 | 1.18 | 57.28 |
| 15-calculated | 1.18 | 44.11 |
| 16 | 1.50 | 51.89 |
| 17-calculated | 1.50 | 39.96 |
| 18 | 2.50 | 49.83 |
| 19 | 2.50 | 38.50 |

FIG. 4 and TABLE 1 show that a lower oxidation state of the system will effect the particle size of the final HACN by making the HACN larger. If the oxidation is increased prior to carbon addition to an absorbance of 1.5 AU or greater, the parameter controlling the HACN particle size then principally becomes a function of the temperature of the reaction, as stated above.

The effect of the state of oxidation of the system and the temperature of the reaction are believed to be independent, but they both effect the particle size of the HACN. That both the state of oxidation of the system and the temperature of the reaction independently effect HACN particle size, as herein discovered and described, can help account for numerous previous reaction investigations that had yielded confounding particle size results.

According to the data presented here, it appears that the state of oxidation of the system should be where the absorbance at 505 nm is greater than 1.5 AU. In one preferred embodiment of the invention, the recommended level of oxidation would be to an absorbance of 2.5 AU at 505 nm, with the period of time required to achieve such a level of absorbance being a function of the flow rate of air/oxygen into the system.

Examples 20–25

Effect of Airflow (Air/Oxygen) on Reaction Time

In these Examples, the effect of airflow on the HACN reaction was studied to see if the rate of air addition would effect either or both particle size and reaction time.

The airflow was measured with a bubble flow meter that is placed in-line with the reactor. The flow rate was measured to milliliters of air per minute. This airflow was air only. No oxygen was added to the airflow. The reaction time was determined by measuring the absorbance of the reaction solution and calculating when the absorbance achieved a value of 0.20 AU. This reaction timed was extrapolated or interpolated as needed in each particular case.

Figure 5:
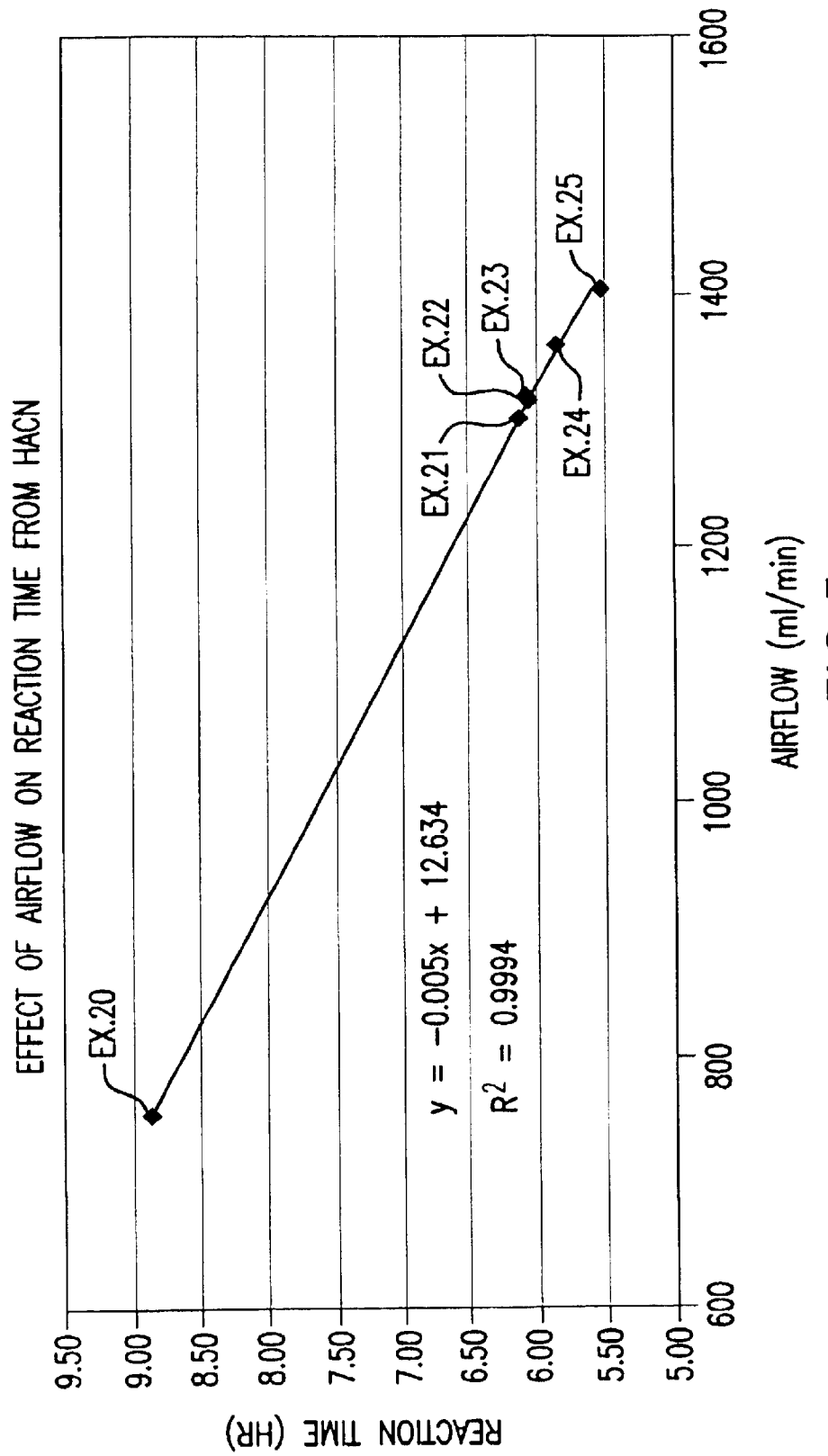
FIG. 5 is a graphical representation of reaction time as a function of reaction airflow obtained in Examples 20 to 25.

It was found that changes in airflow had no effect on the particle size of the HACN produced (as long as the temperature was controlled). Airflow, however, was found to have a direct effect on reaction time as shown in FIG. 5 which is a graphical representation of reaction time versus airflow rate data obtained in these examples.

The data showed that the overall reaction time was directly related to the airflow into the system. The higher the airflow rate the faster the reaction took place. Large reactor scale tests, where pure oxygen was added to the air stream, have shown that increasing the oxygen content of the air decreases the reaction time. The overall rate-determining step in the HACN synthesis is the introduction of the oxygen. The flow rate did not effect the particle size or the reactions.

Examples 26 and 27

Effect of Carbon Catalyst Content on the Reaction Time and Particle Size

As described above, carbon is believed to act as a catalyst such as to help facilitate substitution of the final ammine group onto the cobalt complex. Once the final ammine is substituted, the HACN is formed and the HACN precipitates due to a much lower solubility. The carbon may or may not be occluded upon the precipitation. The amount of occlusion that occurs has not been analytically determined but it is known that the carbon presence continues to catalyze the reaction.

The effect of carbon content on reaction time and particle size realized in these examples is shown in TABLE 2, below.

TABLE 2

| Example | Carbon Content (%) | Reaction Time (hrs) | Particle Size ($\mu$m) |
|---|---|---|---|
| 26 | 1.00 | 5.82 | 54.52 |
| 27 | 0.25 | 8.16 | 39.58 |

While the presence of 1.0% carbon in the final HACN material has been alleged as essential to achieving reasonable reaction times for certain prior art preparation techniques, Example 27 shows that this is false. The carbon content does, however, effect the reaction time as Example 27 showed a reaction time of about 40% longer than Example 26.

The HACN that was produced in Example 27 appeared to be almost re-crystallized HACN. Increasing airflow may be used as a means to reduce or minimize the difference between the reaction times resulting from reducing the carbon catalyst content. Further, the difference in particle size can be compensated for by increasing the reaction temperature, as described above.

As will be appreciated by those skilled in the art and guided by the teachings herein provided, the fact that HACN can be manufactured at a lower carbon content than here before thought possible has important implications for corresponding gas generant material manufacture and production. For example, reducing the carbon content of the material will generally permit the inclusion of a relatively greater amount of the high gas yielding fuel or generant in the same volume of material. As a result, smaller, lighter and/or less costly inflator devices and corresponding inflatable restrain systems can be designed and used.

Examples 28–34

Effect of Various Amounts of Ammonia on Reaction and Residual Ammonia Upon Completion In these tests, the HACN synthesis process reactions was performed at various amounts of ammonia and the labile ammonia at the end of the reaction was determined. The amounts of labile ammonia are reported here instead of percent "free ammonia." In the tests at lower equivalents of ammonia, the reaction was short on ammonia and a blue/green precipitate was formed as the HACN reaction. This blue/green precipitate is believed to be a cobalt (II) ammine aqua hydroxide $[Co(NH_3)_x(H_2O)_{6-x}]^{2+}[(OH)_2]^{2-}$. Once the mother liquor was titrated with acid the ammonia from this complex was titrated along with any free ammonia, therefore it was labeled "labile ammonia." Once the HACN complex was formed, the complexed ammonia does not seem to be effected by the acid titration and therefore the acid only titrates the "free ammonia."

Figure 6:
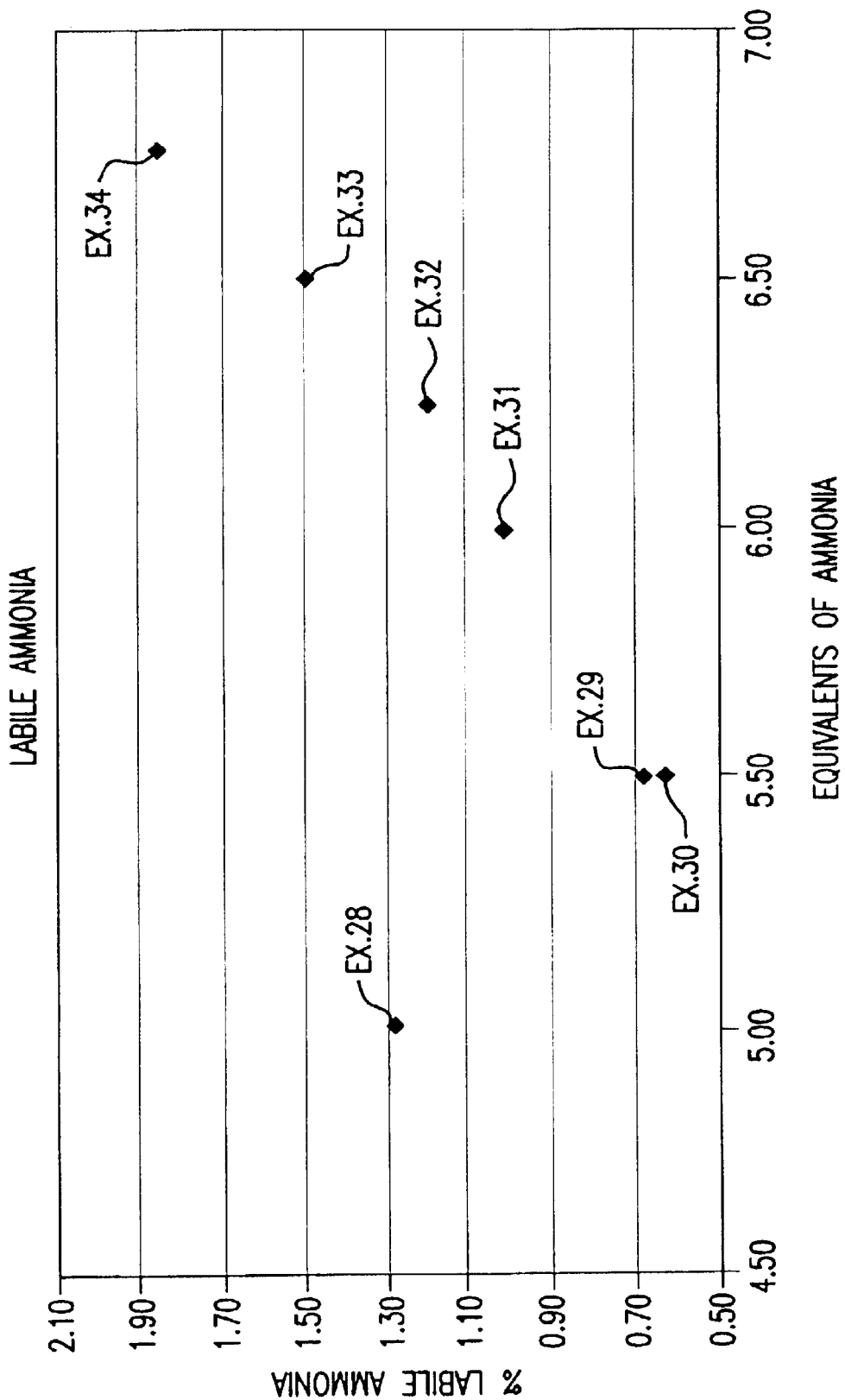
FIG. 6 is a graphical representation of labile ammonia as a function of equivalents of ammonia in Examples 28 to 34.

FIG. 6 shows the residual amounts left in the mother liquor versus the equivalents added for each of the tests.

Based on this data, the required amount of ammonia appears to be about 5.50 equivalents. Thus, providing for a slight margin of error, the reaction process can desirably be performed at 5.75 equivalents, such as corresponding to a final ammonia content of approximately 0.83%. Those skilled in the art and guided by the teachings herein provided will appreciate that operation with the addition or inclusion of a sufficient quantity of the ammonia source to the reaction vessel to provide about 5.5 to about 6.5 equivalents of ammonia to cobalt will be generally preferred.

It is to be understood that the discussion of theory, such as the above discussion of adding $Co(NO_3)_2$ and ammonium nitrate to ammonia-containing water results in the introduced cobalt encountering an excess amount of ammonia such that the complex cannot form, for example, is included to assist in the understanding of the subject invention and is in no way limiting to the invention in its broader application.

Thus, the invention generally provides a manner of making a hexammine cobaltic salt, such as HACN, which is desirably both cost effective and time efficient. Further, the invention generally provides a manner of making a hexammine cobaltic salt, such as HACN, which desirably results in a hexammine cobaltic salt product of consistent and desired performance qualities.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of making a hexammine cobaltic salt, the method comprising:
   (a) providing a reaction vessel containing an aqueous solution of at least one ammonia source selected from the group consisting of ammonium hydroxide, ammonia-containing gas and combinations thereof;
   (b) introducing a solution of $Co(X)_2$ and a solution of $NH_4X$, wherein X is at least one selected from the group consisting of chloride, bromide, perchlorate, and nitrate, into the reaction vessel whereby the introduced cobalt encounters an excess amount of ammonia preventing cobalt complex formation and to form reaction vessel contents comprising a first product precursor;
   (c) introducing an oxygen-containing gaseous oxidizer to the reaction vessel contents of (b) to form an at least partially oxidized second product precursor;
   (d) heating the at least partially oxidized second product precursor to form a third product precursor;
   (e) adding a surface active catalyst to the third product precursor;
   (f) continue introducing an oxygen-containing gaseous oxidizer to the catalyst-containing reaction mixture of (e) while maintaining the temperature at a temperature selected to result in product formation of a desired particle size; and
   (g) cooling the mixture from (f) and recovering the hexammine cobaltic salt therefrom as an admixture with the surface active catalyst.

2. The method of claim 1 wherein X is nitrate and the hexammine cobaltic salt is hexammine cobaltic nitrate.

3. The method of claim 2 wherein the first product precursor comprises $Co(NH_3)_5(H_2O)(NO_3)_2$.

4. The method of claim 2 wherein the at least partially oxidized second product precursor comprises $\mu$-peroxobis.

5. The method of claim 2 wherein the third product precursor comprises pentammine-aqua cobaltic nitrate.

6. The method of claim 2 wherein the at least partially oxidized second product precursor is heated in (d) to a temperature in a range of about 95° F. to about 120° F.

7. The method of claim 2 wherein in (f) the temperature is maintained in a range of about 95° F. to about 120° F.

8. The method of claim 1 wherein the providing of the aqueous solution of an ammonia source in the reaction vessel in (a) comprises adding the ammonia source to the reaction vessel in an amount sufficient to provide about 5.5 to about 6.5 equivalents of ammonia to cobalt.

9. The method of claim 1 wherein the solution of $Co(X)_2$ and $NH_4X$ comprises water, $Co(NO_3)_2$ and ammonium nitrate.

10. The method of claim 1 wherein the surface active catalyst comprises activated carbon.

11. The method of claim 10 wherein the activated carbon surface active catalyst is added in an amount sufficient to provide no more than about 1.5% carbon in the hexammine cobaltic salt.

12. The method of claim 11 wherein the activated carbon surface active catalyst is added in an amount sufficient to provide no more than about 0.5% carbon in the hexammine cobaltic salt.

13. The method of claim 12 wherein the activated carbon surface active catalyst is added in an amount sufficient to provide about 0.2–0.3% carbon in the hexammine cobaltic salt.

14. The method of claim 1 wherein the oxygen-containing gaseous oxidizer is introduced to the heated combination in (c) to form an at least partially oxidized reaction mixture having an absorbance @ 505 nm of at least about 1.5 AU.

15. The method of claim 1 wherein the hexammine cobaltic salt recovered in (f) is of a particle size in the range of about 35 microns to about 60 microns.

16. The method of claim 1 wherein the reaction vessel contents of (b) are heated prior to the initiation of the introduction of the oxygen-containing gaseous oxidizer.

17. The method of claim 1 wherein the introduction of the solution of $Co(X)_2$ and the solution of $NH_4X$ comprises introducing a solution containing both $Co(X)_2$ and $NH_4X$.

18. A method of making a hexammine cobaltic nitrate having a particle size in the range of about 35 microns to about 60 microns, the method comprising:
   (a) providing a reaction vessel containing an aqueous solution of at least one ammonia source selected from the group consisting of ammonium hydroxide, an ammonia-containing gas and combinations thereof;
   (b) introducing a solution of $Co(NO_3)_2$ and $NH_4NO_3$ into the reaction vessel to form reaction vessel contents comprising a first product precursor comprising $Co(NH_3)_5(H_2O)(NO_3)_2$;
   (c) heating the first product precursor to a temperature in the range of 95° F. to 120° F.;
   (d) introducing an oxygen-containing gaseous oxidizer to the heated first product precursor in (c) to form an at least partially oxidized reaction mixture having an absorbance @ 505 nm of at least about 1.5 AU;

(e) adding a surface active catalyst of activated carbon to the reaction mixture of (d);

(f) continue introducing an oxygen-containing gaseous oxidizer to the catalyst-containing reaction mixture of (e) while maintaining the temperature within a range of about 95° F. to about 120° F. and which temperature is selected to result in to result in the hexammine cobaltic nitrate having a desired particle size; and (g) cooling the mixture from (f) and recovering the hexammine cobaltic nitrate therefrom as an admixture with the surface active catalyst.

19. The method of claim 18 wherein the providing of the aqueous solution of an ammonia source in the reaction vessel in (a) comprises adding the ammonia source to the reaction vessel in an amount sufficient to provide about 5.5 to about 6.5 equivalents of ammonia to cobalt.

20. The method of claim 18 wherein the activated carbon surface active catalyst is added in an amount sufficient to provide no more than about 1.5% carbon in the hexammine cobaltic salt.

21. The method of claim 18 wherein in (d), the oxygen-containing gaseous oxidizer is introduced to the heated first product precursor in (c) to form an at least partially oxidized reaction mixture having an absorbance @ 505 nm of about 2.5 AU.

22. A method of making a hexammine cobaltic nitrate having a selected particle size, the method comprising:

(a) providing a reaction vessel containing an aqueous solution of at least one ammonia source selected from the group consisting of ammonium hydroxide, ammonia-containing gas and combinations thereof;

(b) introducing a solution of $Co(NO_3)_2$ and $NH_4NO_3$ into the reaction vessel to form reaction vessel contents comprising $Co(NH_3)_5(H_2O)(NO_3)_2$;

(c) introducing an oxygen-containing gaseous oxidizer to the reaction vessel contents of (b) to form $\mu$-peroxobis;

(d) heating the $\mu$-peroxobis to form pentammine-aqua cobaltic nitrate;

(e) adding a surface active catalyst of activated carbon to the pentammine-aqua cobaltic nitrate;

(f) continue introducing an oxygen-containing gaseous oxidizer to the catalyst-containing reaction mixture of (e) while maintaining the temperature at a selected temperature in the range of about 95° F. to about 120° F. to result in the hexammine cobaltic nitrate having a selected particle size in the range of about 35 microns to about 60 microns; and (g) cooling the mixture from (f) and recovering the hexammine cobaltic nitrate therefrom as an admixture with the surface active catalyst.

23. The method of claim 22 wherein the providing of the aqueous solution of the at least one ammonia source in the reaction vessel in (a) comprises adding the ammonia source to the reaction vessel in an amount sufficient to provide about 5.5 to about 6.5 equivalents of ammonia to cobalt.

24. The method of claim 22 wherein the activated carbon surface active catalyst is added in an amount sufficient to provide no more than about 1.5% carbon in the hexammine cobaltic salt.

25. The method of claim 22 wherein the oxygen-containing gaseous oxidizer is introduced to the heated combination in (c) to form an at least partially oxidized reaction mixture having an absorbance @ 505 nm of at least about 1.5 AU.

26. The method of claim 22 wherein the reaction vessel contents of (b) are heated prior to the initiation of the introduction of the oxygen-containing gaseous oxidizer.

27. A method of making a hexammine cobaltic salt, the method consisting essentially of:

(a) providing a reaction vessel containing an aqueous solution of at least one ammonia source selected from the group consisting of ammonium hydroxide, ammonia-containing gas and combinations thereof;

(b) introducing a solution of $Co(X)_2$ and a solution of $NH_4X$, wherein X is at least one selected from the group consisting of chloride, bromide, perchlorate, and nitrate, into the reaction vessel to form reaction vessel contents comprising a first product precursor;

(c) introducing an oxygen-containing gaseous oxidizer to the reaction vessel contents of (b) to form an at least partially oxidized second product precursor;

(d) heating the at least partially oxidized second product precursor to form a third product precursor;

(e) adding a surface active catalyst to the third product precursor;

(f) continue introducing an oxygen-containing gaseous oxidizer to the catalyst-containing reaction mixture of (e) while maintaining the temperature at a temperature selected to result in product formation of a desired particle size; and (g) cooling the mixture from (t) and recovering the hexammine cobaltic salt therefrom as an admixture with the surface active catalyst.

28. The method of claim 27 wherein X is nitrate and the hexammine cobaltic salt is hexammine cobaltic nitrate.

29. The method of claim 28 wherein the first product precursor comprises $Co(NH_3)_5(H_2O)(NO_3)_2$.

30. The method of claim 28 wherein the at least partially oxidized second product precursor comprises $\mu$-peroxobis.

31. The method of claim 28 wherein the third product precursor comprises pentammine-aqua cobaltic nitrate.

32. The method of claim 28 wherein:

the providing of the aqueous solution of an ammonia source in the reaction vessel in (a) comprises adding the ammonia source to the reaction vessel in an amount sufficient to provide about 5.5 to about 6.5 equivalents of ammonia to cobalt;

the activated carbon surface active catalyst is added in an amount sufficient to provide no more than about 1.5% carbon in the hexammine cobaltic salt; and in (d), the oxygen-containing gaseous oxidizer is introduced to the heated first product precursor in (c) to form an at least partially oxidized reaction mixture having an absorbance @ 505 nm of about 2.5 AU.

* * * * *